United States Patent
Berg et al.

(10) Patent No.: US 11,184,331 B1
(45) Date of Patent: Nov. 23, 2021

(54) STREAM ENCRYPTION KEY MANAGEMENT

(71) Applicant: Alarm.com Incorporated, Tysons, VA (US)

(72) Inventors: Benjamin Asher Berg, Washington, DC (US); Christopher Silverman, Alexandria, VA (US)

(73) Assignee: Alarm.com Incorporated, Tysons, VA (US)

( * ) Notice: Subject to any disclaimer, the term of this patent is extended or adjusted under 35 U.S.C. 154(b) by 496 days.

(21) Appl. No.: 15/860,577

(22) Filed: Jan. 2, 2018

Related U.S. Application Data (60) Provisional application No. 62/440,625, filed on Dec. 30, 2016.

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0861* (2013.01); *H04L 9/14* (2013.01); *H04L 9/3226* (2013.01); *H04L 63/0272* (2013.01); *H04L 63/166* (2013.01); *H04N 21/2347* (2013.01); *H04N 21/26613* (2013.01); *H04N 21/4405* (2013.01)

(58) Field of Classification Search
CPC ..... H04L 63/0428; H04L 9/0861; H04L 9/14; H04L 9/3226; H04L 63/0272; H04L 63/166; H04N 21/2347; H04N 21/26613; H04N 21/4405
See application file for complete search history.

(56) References Cited

U.S. PATENT DOCUMENTS

| | | |
|---|---|---|
| 5,793,871 A | 8/1998 | Jackson |
| 6,070,198 A | 5/2000 | Krause et al. |
| (Continued) | | |

OTHER PUBLICATIONS

J. Huang and H. Qian, "Video Encryption for Security Surveillance," 2007 41st Annual IEEE International Carnahan Conference on Security Technology, Ottawa, Ont., 2007, pp. 207-211. (Year: 2007).*

(Continued)

*Primary Examiner* — Robert B Leung
*Assistant Examiner* — Sameera Wickramasuriya
(74) *Attorney, Agent, or Firm* — Fish & Richardson P.C.

(57) ABSTRACT

In some implementations, a system is capable of managing keys for encrypting media streams over UDP communications between a media source and an associated server. A key is initially generated for encrypting a media stream captured by a media source device associated with a monitoring system of a property. A first instruction is provided to the media source device and over a secure communication channel. The first instruction causes the media source device to encrypt the media stream using the key when received by the media source device. A second instruction is generated for decrypting the encrypted media stream. The second instruction is provided to a computing device associated with the property. The second instruction causes the computing device to decrypt the encrypted media stream when received by the computing device.

16 Claims, 7 Drawing Sheets

(51) Int. Cl.
   *H04L 9/14* (2006.01)
   *H04N 21/4405* (2011.01)
   *H04L 9/32* (2006.01)
   *H04N 21/2347* (2011.01)
   *H04N 21/266* (2011.01)

(56) References Cited

U.S. PATENT DOCUMENTS

| | | | |
|---|---|---|---|
| 7,237,108 B2 | 6/2007 | Medvinsky et al. | |
| 7,243,366 B2 | 7/2007 | Medvinsky et al. | |
| 7,508,941 B1* | 3/2009 | O'Toole, Jr. | G08B 13/19671 |
| | | | 380/228 |
| 8,005,216 B1* | 8/2011 | Agrawal | H04N 21/2347 |
| | | | 380/200 |
| 10,139,897 B2* | 11/2018 | Grabau | G06K 9/00771 |
| 10,142,122 B1* | 11/2018 | Hill | H04L 12/2807 |
| 10,193,875 B2* | 1/2019 | Wang | H04L 63/0428 |
| 2002/0023209 A1 | 2/2002 | Domstedt et al. | |
| 2003/0018891 A1 | 1/2003 | Hall et al. | |
| 2004/0141614 A1* | 7/2004 | Choi | H04N 7/1675 |
| | | | 380/200 |
| 2005/0195975 A1 | 9/2005 | Kawakita | |
| 2006/0161960 A1* | 7/2006 | Benoit | G08B 13/19656 |
| | | | 725/105 |
| 2007/0130254 A1* | 6/2007 | Russ | H04N 21/4126 |
| | | | 709/203 |
| 2008/0253564 A1* | 10/2008 | Kahn | H04N 7/20 |
| | | | 380/200 |
| 2009/0220080 A1 | 9/2009 | Herne et al. | |
| 2009/0285391 A1* | 11/2009 | Johnson | G06F 21/10 |
| | | | 380/200 |
| 2009/0323946 A1* | 12/2009 | Wasilewski | H04N 21/4147 |
| | | | 380/200 |
| 2012/0195425 A1* | 8/2012 | Kim | H04L 9/065 |
| | | | 380/200 |
| 2012/0237027 A1* | 9/2012 | Yeh | H04N 7/1675 |
| | | | 380/200 |
| 2013/0039487 A1 | 2/2013 | McGrew | |
| 2013/0202110 A1* | 8/2013 | Ducharme | H04N 21/23476 |
| | | | 380/200 |
| 2014/0044258 A1* | 2/2014 | Grewal | H04N 21/4627 |
| | | | 380/200 |
| 2014/0105389 A1* | 4/2014 | Jung | H04L 9/0662 |
| | | | 380/200 |
| 2014/0105390 A1* | 4/2014 | Chen | H04L 63/062 |
| | | | 380/200 |
| 2014/0185801 A1* | 7/2014 | Wang | H04L 9/0662 |
| | | | 380/200 |
| 2014/0195797 A1 | 7/2014 | du Toit | |
| 2014/0219446 A1* | 8/2014 | DePietro | H04N 7/1675 |
| | | | 380/200 |
| 2015/0104013 A1* | 4/2015 | Holman | G06F 21/602 |
| | | | 380/243 |
| 2016/0246977 A1* | 8/2016 | Raskin | H04L 63/0428 |
| 2017/0344728 A1* | 11/2017 | Steele | G06F 21/10 |

OTHER PUBLICATIONS

R. Iqbal, S. Shirmohammadi, A. E. Saddik and J. Zhao, "Compressed-Domain Video Processing for Adaptation, Encryption, and Authentication," in IEEE MultiMedia, vol. 15, No. 2, pp. 38-50, Apr.-Jun. 2008, doi: 10.1109/MMUL.2008.23. (Year: 2008).*

D. C. Gavankar, M. Chatterjee and S. J. Lawand, "Secure real time remote video monitoring using selective encryption," 2012 World Congress on Information and Communication Technologies, 2012, pp. 453-457, doi: 10.1109/WICT.2012.6409120. (Year: 2012).*

* cited by examiner

STREAM ENCRYPTION KEY MANAGEMENT

CROSS-REFERENCE TO RELATED APPLICATIONS

This application claims the benefit of U.S. Provisional Patent Application No. 62/440,625, filed on Dec. 30, 2016 and titled "STREAM ENCRYPTION KEY MANAGEMENT," which is incorporated herein by reference in its entirety.

TECHNICAL FIELD

This disclosure relates to network technology and, for example, techniques for establishing encrypting video stream data.

BACKGROUND

In secure communications, a key can be a piece of information that determines a functional output of an encryption algorithm. The key can specify the transformation of information from a secured (or encrypted) format to an unsecured (or decrypted) format, and vice versa. Keys are often transferred between two entities such as a server and an authorized client device to allow communications between the two entities to become private, secure, and reliable. Keys may use various encryption schemes to secure communications between various types of devices.

SUMMARY

Encryption key management is often used to secure web communications over Hypertext Transfer Protocol (HTTP) over Transport Layer Security (TLS) (HTTPS). However, the HTTPS protocol is often not suitable for real-time applications due to its reliance on acknowledged Transport Control Protocol (TCP), which introduces latency in data transmissions over low quality connections. In addition, real-time communications that rely upon User Datagram Protocol (UDP) to reduce latency and fault tolerance are often less well-defined and are frequently not implemented for embedded client communications even when UDP-based applications exist with support for transport or application-level encryption.

Accordingly, this specification describes a system that is capable of managing keys for encrypting media streams over UDP communications between a media source and an associated server. The media source may be associated with a monitoring system of a property and configured to capture media and periodically transmit the captured media to the server. For example, the media source can be a video camera that detects motion within a property and transmits captured video with detected motion to the server. The server can then either process and store the captured video, stream the captured video to a client device for viewing, among others.

The system is capable of performing the key management techniques on an existing "out-of-band" secure communication channel such as a persistent virtual private network (VPN) tunnel, a persistent web socket tunnel, or any other type of an encrypted channel. In some implementations, the media source constantly pings the server on a particular port to maintain an open connection with the server. In such implementations, the server is capable of identifying the port of the media source and transmitting the key over the particular port.

The system is also capable of using the key management techniques for various types of client applications (e.g., streaming captured media, remote media management, etc.). In this regard, the system can easily implement the key management techniques in an existing UDP communication framework without the need for implementing complex management protocols that are typically associated with performing key management on an application-by-application basis.

In one general aspect, a computer-implemented method may be performed by a server associated with a property monitoring system that includes a media source. The method can include generating an encryption key for a media stream collected by the media source. The server then transmits, to the media source, an instruction including the encryption key. The server then obtains, from the media source, encrypted data that includes the media stream collected by the media source. The server finally performs a particular action relating to the obtained encrypted data. The method may be implemented in various implementations described in more detail below.

The details of one or more implementations are set forth in the accompanying drawings and the description below. Other features will be apparent from the description and drawings.

The details of one or more implementations are set forth in the accompanying drawings and the description, below. Other potential features and advantages of the disclosure will be apparent from the description and drawings, and from the claims.

DETAILED DESCRIPTION

This specification describes a system that is capable of managing keys for encrypting media streams over UDP communications between a media source and an associated server. The media source may be associated with a monitoring system of a property and configured to capture media and periodically transmit the captured media to the server. For example, the media source can be a video camera that detects motion within a property and transmits captured video with detected motion to the server, the server could request video content from the camera in response to another event in the system, or the server could request a live stream from the camera on-demand to fulfill a user's immediate request. The server can then either process and store the captured video, stream the captured video to a client device for viewing, among others.

The system is capable of performing the key management techniques on an existing "out-of-band" secure communication channel such as a persistent virtual private network (VPN) tunnel, a persistent web socket tunnel, or any other type of encrypted channel. The system also capable of using the key management techniques for various types of client applications (e.g., streaming captured media, remote media management, etc.). In this regard, the system can easily implement the key management techniques in an existing UDP communication framework without the need for implementing complex management protocols that are typically associated with performing key management on an application-by-application basis.

The system can use various techniques to adjust or change the key used to encrypt media streams in order to improve security of the secured communication. In some implementations, the system generates a unique key for each transmission session between the server 150 and the user device 140*a*, or each transmission session between the server 150 and the user device 140*b*, or each transmission session between the server 150 and the media source 130. In other implementations where media streams are continuously transmitted, the system may generate a key with a predetermined set of security attributes (e.g., a defined validity time period). In such implementations, a new key may be issued once a previously issued key has expired.

Figure 1:
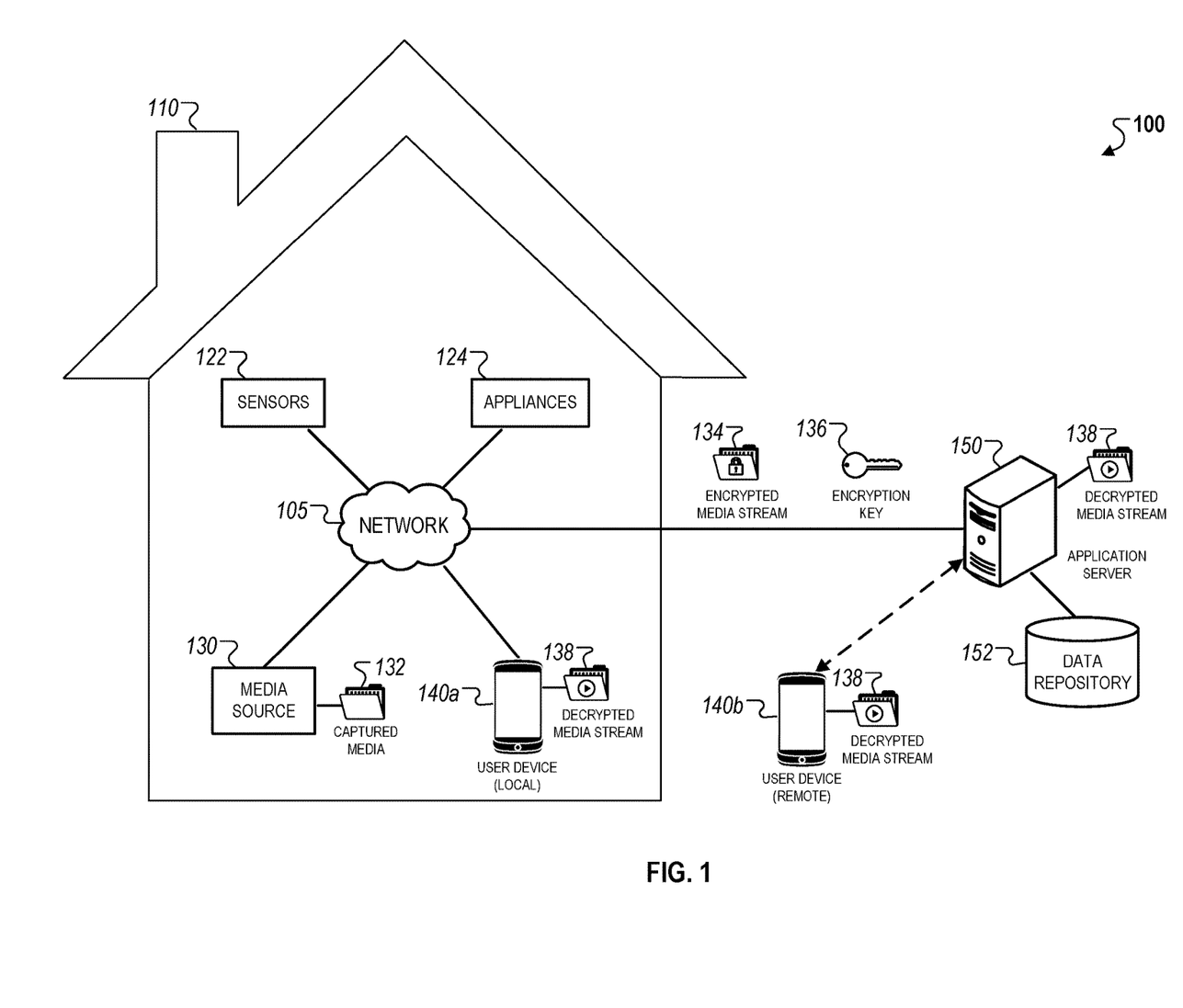
FIG. 1 illustrates an example of a system that is capable of managing encryption keys for a media stream.

FIG. 1 illustrates an example of a system 100 that is capable of managing keys to provide secure communications of a media stream. The system 100 can include various devices that are located within a property 110 such as sensors 122, appliances 124, one or more media sources 130, and a user device 140*a* connected over a network 105. The system 100 also includes an application server 150, which exchanges communications with the devices within the property 110 over the network 105, and a user device 140*b* that is remote from the property 110. The application server 150 includes a repository 152 for storing data transmitted from the devices located within the property 110 (e.g., the media source 130) over the network 105. In some instances, the user devices 140*a* and 140*b* may represent the same device in different locations (e.g., inside and outside the property 110).

In general, the system 100 is capable of managing an encryption key 136 that is used enable secure communications between, for example, the media source 130 and the application server 150, the media source 130 and the user devices 140*a*, 140*b*, and/or the application server 150 and the user devices 140*a*, 140*b*. The secure communications allow for the transmission of media 132 captured by the media source 130. The media 132 can be any type of continuous or segmented monitoring data of the property 110 such as security video footage, motion detection data, presence monitoring data, among others.

The system 100 uses the encryption key 136 to secure (or encrypt) the captured media 132 into a secured (or encrypted) media stream 134, which is then transmitted from the media source 130 to the application server 150 over the network 105. For example, the media source 130 may use various cryptographic techniques to generate the encrypted media stream 134 using the encryption key 136. For example, the system 100 may use one or more of a symmetric-key algorithm, a block cipher, a stream cipher, a cryptographic hash function, among others.

The secured media stream 134 is then transmitted over the network 105 to the application server 150 and/or the user devices 140*a* and 140*b*. The application server 150 and/or the user devices 140*a* and 140*b* then decrypt the encrypted media stream 134 using the encryption key 136 using techniques similar to the encryption techniques described above. The application server 150 and/or the user devices 140*a*, 140*b* then perform various operations with the decrypted media stream 138 as described in more detail with respect to FIGS. 3A-3D, for example.

The application server 150 can include a VPN server that communicates with the media source 130 and/or the client devices 140*a*, 140*b* over a VPN tunnel. In some implementations, the system 100 utilizes the VPN tunnel to exchange both the encryption key 136 and the encrypted media stream 134 between the application server 150, the media source 130, and the client devices 140*a*, 140*b*. Alternatively, in other implementations, the system 100 utilizes the VPN channel to only exchange the encryption key 136, but not the encrypted media stream 134. In such implementations, the system 100 utilizes a separate communication channel to exchange the encrypted media stream 134. The communication channel need not be secure since the transmitted media stream is already encrypted by the media source 130.

Referring now to the components of the system 100, the network 105 may be configured to enable data communications between devices connected to the network 105. For example, the network 105 may be configured to enable exchange of data communications between the sensors 122, the appliances 124, the media source 130, the user devices 140*a*, 140*b*, and the application server 150.

The network 105 may include, for example, Local Area Networks (LANs), for example, Wi-Fi, analog or digital wired and wireless telephone networks, for example, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data.

The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network may support video transmission using, for example, RTSP, H.264. or other comparable protocols used for real time video transmission. The network 105 may also be a wireless network, a broadband network, or a combination of networks including a wireless network and a broadband network.

The sensors 122 may include one or more of a contact sensor, a motion sensor, a glass break sensor, an occupancy sensor, or any other type of sensor that can be included in an alarm or security system. The sensors 122 may also include an environmental sensor, such as a temperature sensor, a water sensor, a rain sensor, a wind sensor, a light sensor, a smoke detector, a carbon monoxide detector, an air quality sensor, etc. The sensors 122 may further include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105.

The media source 130 can be any type of electronic device that collects and/or monitors data streams as the captured media 132. The media source 130 can be a network recorder, an analog-to-digital video converter, a camera, or any other type of sensor that collects continuous data. In some implementations, the media source 130 can be associated with monitoring system that also includes the sensors 122 and the appliances 124. In such implementations, the media source 130 can either be included within the sensors 122 or may be a separate device within the monitoring system.

As described above, the media source 130 periodically transmits the captured media 132 as the encrypted media stream 134 in a secure communication with the application server 150 and/or the user devices 140a, 140b over the network 105. For example, the media source 130 may initially encrypt the captured media 132 using the encryption key 136 and transmit to generate the encrypted media stream 134. The media source 130 then transmits the encrypted media stream 134 to the application server 150. In other examples, the media source 130 transmits the encrypted media stream 134 to the user device 140a over a local network within the property 110. In such examples, the media source 130 may locally transmit the encrypted media stream 134 to the user device 140a, which then relays the transmitted encrypted media stream 134 to the application server 150.

The user devices 140a, 140b may be any type of personal electronic computing devices that are associated with a user of the property 110. For example, the user devices 140a, 140b may be one or more of a cellular telephone, smartphone, a tablet computing device, a laptop computing device, a desktop computing device, a wearable device, or any other type of network-enabled electronic device. The user devices 140a, 140b can also execute one or more native applications.

In some implementations, the user devices 140a, 140b may communicate with and receive data associated with the system 100 from the media source 130. The type and method of communication can vary based on whether the device is located within the property 110 or is remote from the property 110. For instance, the user device 140a, which is located within the property 110, may communicate with the media source 130 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards. Alternatively, the user device 140b, which is remote from the property 110, may also connect remotely to the media source 130 and other devices of the system 100 over the network 105 through the application server 150.

The user devices 140a, 140b may include a native application. The native application refers to a software/firmware program running on the user devices 140a, 140b that enables various features. For instance, the user devices 140a, 140b may load or install the native application based on data received over a network 105 or data received from local media. The native monitoring application may run on various mobile device operating systems. The native application of the user devices 140a, 140b may identify a geographic location associated with the user devices 140a, 140b and communicate information identifying the geographic location. For example, the user devices 140a, 140b having the native application may determine a geographic location of the user devices 140a, 140b using GPS capabilities, and may communicate data identifying the geographic location to the application server 150. In some instances, the native application may check the location of the user devices 140a, 140b periodically and may detect when the user is presently located inside or outside the property 110.

The application server 150 may be a remote monitoring server that periodically encrypted media streams 134 in a secure communication with the media source 130 and/or the user devices 140a, 140b over the network 105. The application server 150 includes a VPN server that exchanges secure communications with the media source 130 over a VPN tunnel as illustrated in FIGS. 3A-3D. The application server 150 also exchange secure communications with the user devices 140a, 140b. The communications with the media source 130 utilize the UDP protocol to reduce latency associated with data transmissions, whereas the communications with the user devices 140a, 140b utilize HTTPS protocol. In some instances, the application server 150 may exchange communications with both the media source 130 and the user devices 140a, 140b during a transmission session of the encrypted media stream 134. Different scenarios relating to such transmission sessions are illustrated in FIGS. 3A-3D and described in greater detail below.

Figure 2:
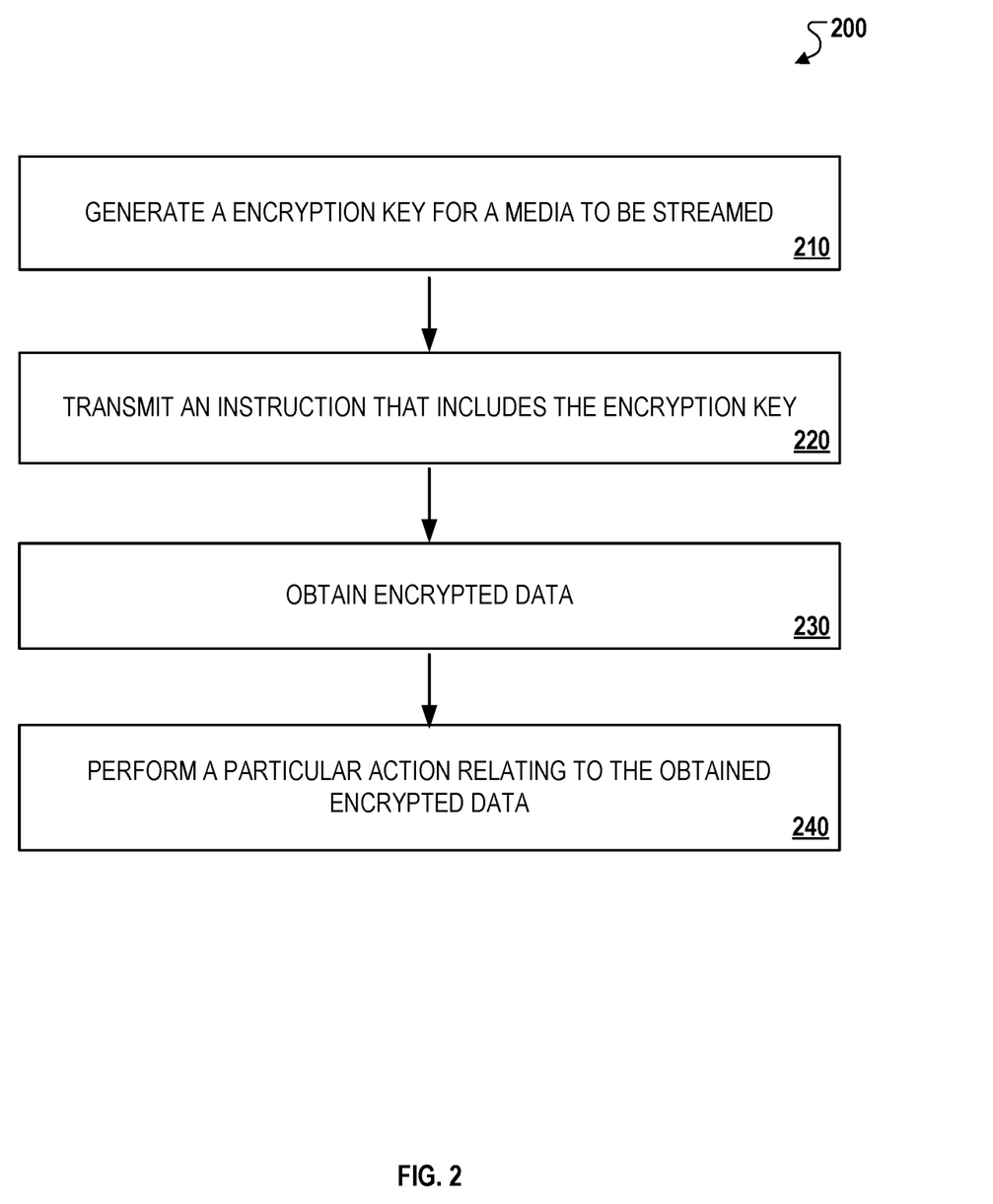
FIG. 2 illustrates an example of a process for managing encryption keys for a media stream.

FIG. 2 illustrates an example of a process 200 for managing encryption keys for a media stream. Briefly, the process 200 may include generating an encryption key for media to be streamed (210), transmitting an instruction that includes the encryption key (220), obtaining an encrypted data (230), and performing a particular action relating to the obtained encrypted data (240).

In more detail, the process 200 may include generating an encryption key for media to be streamed (210). For instance, the application server 150 may generate the encryption key 136 for the media 132 captured by the media source 130. As described above, the application server 150 can generate a unique encryption key 136 for each transmission session where data is transmitted from the media source 130 in a secure communication to the application server 150 and/or the user devices 140a, 140b over the network 105. In some implementations where the captured media 132 is continuously captured by the media source 130, the generated encryption key 136 can instead have a predetermined validity period during which it can be used to encrypt and decrypt the captured media 132.

The process 200 may include transmitting an instruction that includes the encryption key (220). For instance, after generating the encryption key 136, the application server 150 may transmit an instruction that includes the generated encryption key 136 to the media source 130 and/or the user devices 140a, 140b. In some implementations, the encryption key 136 is transmitted from the application server 150 to the media source 130 via a VPN channel.

Figure 3A:
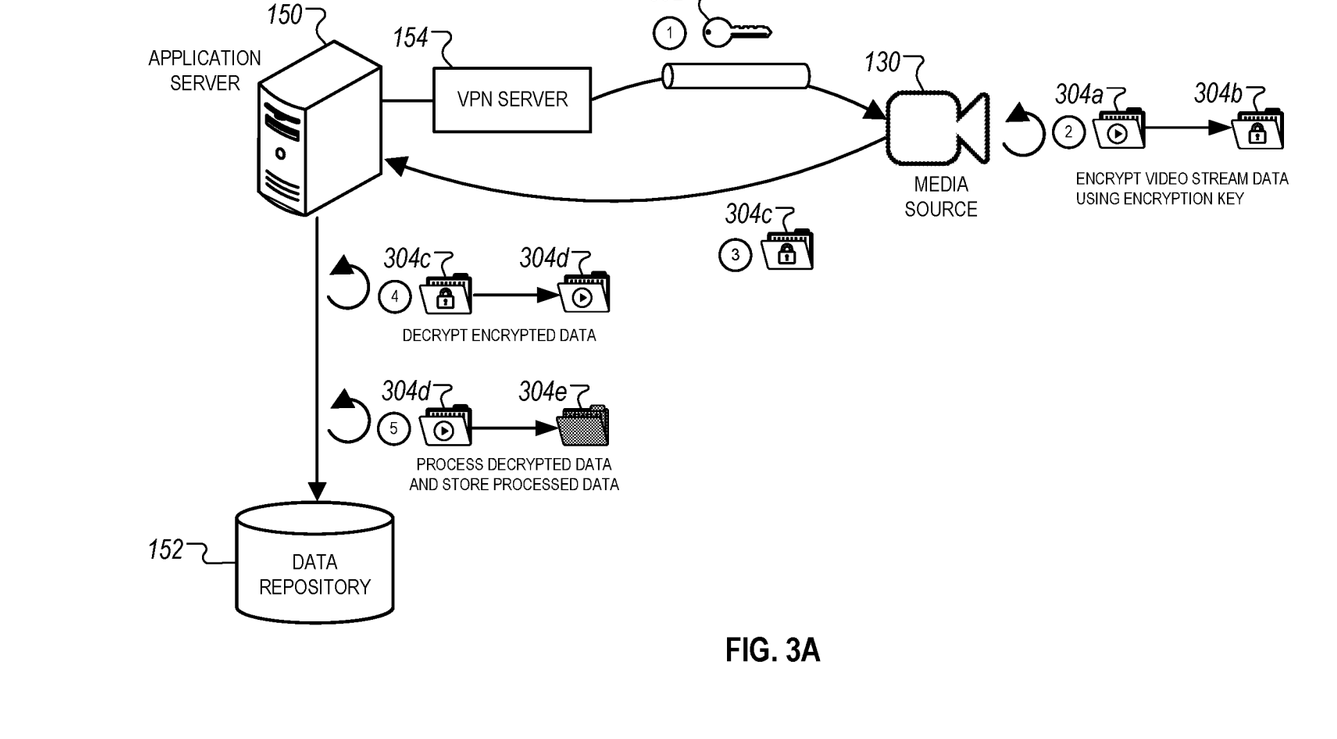
FIGS. 3A-3D illustrate examples of architectures for managing encryption keys for media streams.

In some implementations, the instruction is only transmitted to the media source 130 for encrypting the captured media 132 to generate the encrypted media stream 134 that is transmitted over the network 105. In such implementations, decryption of the encrypted media stream 134 is performed on the application server 150 and transmitted to the user devices 140a, 140b for viewing, modification, and playback. An example of this implementation is illustrated in FIG. 3A and described in more detail below.

Figure 3B:
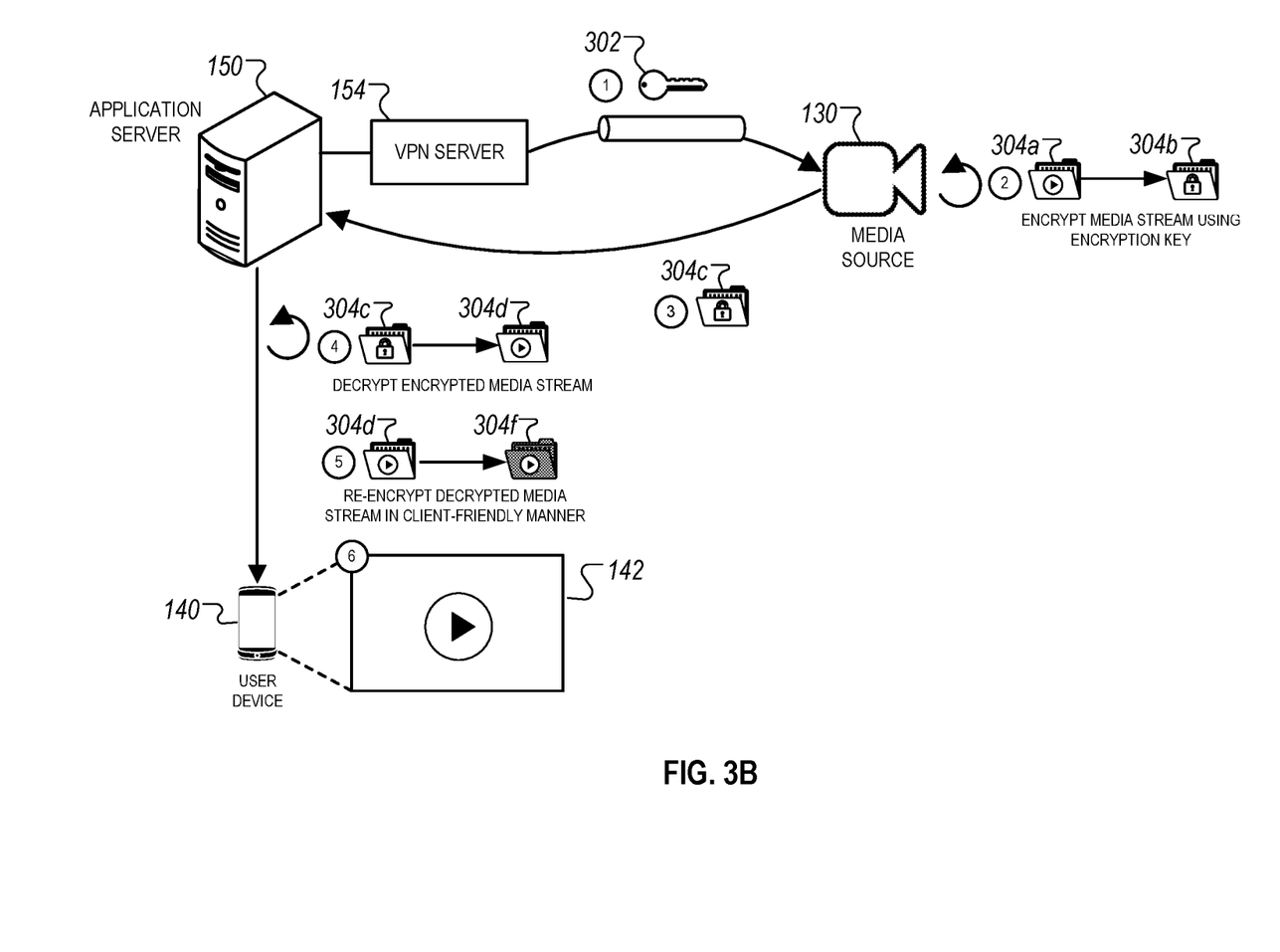
Figure 3C:
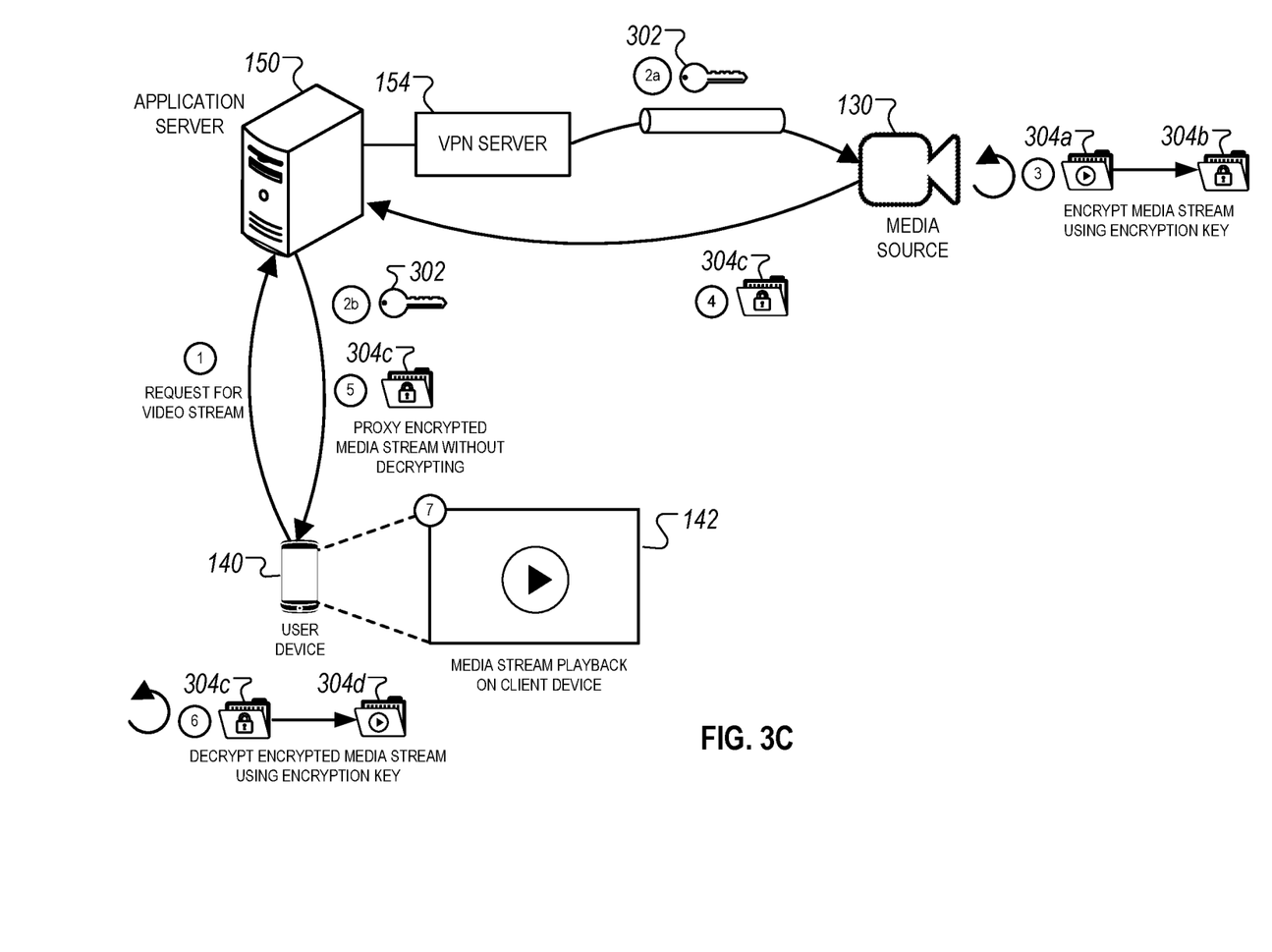
Figure 3D:
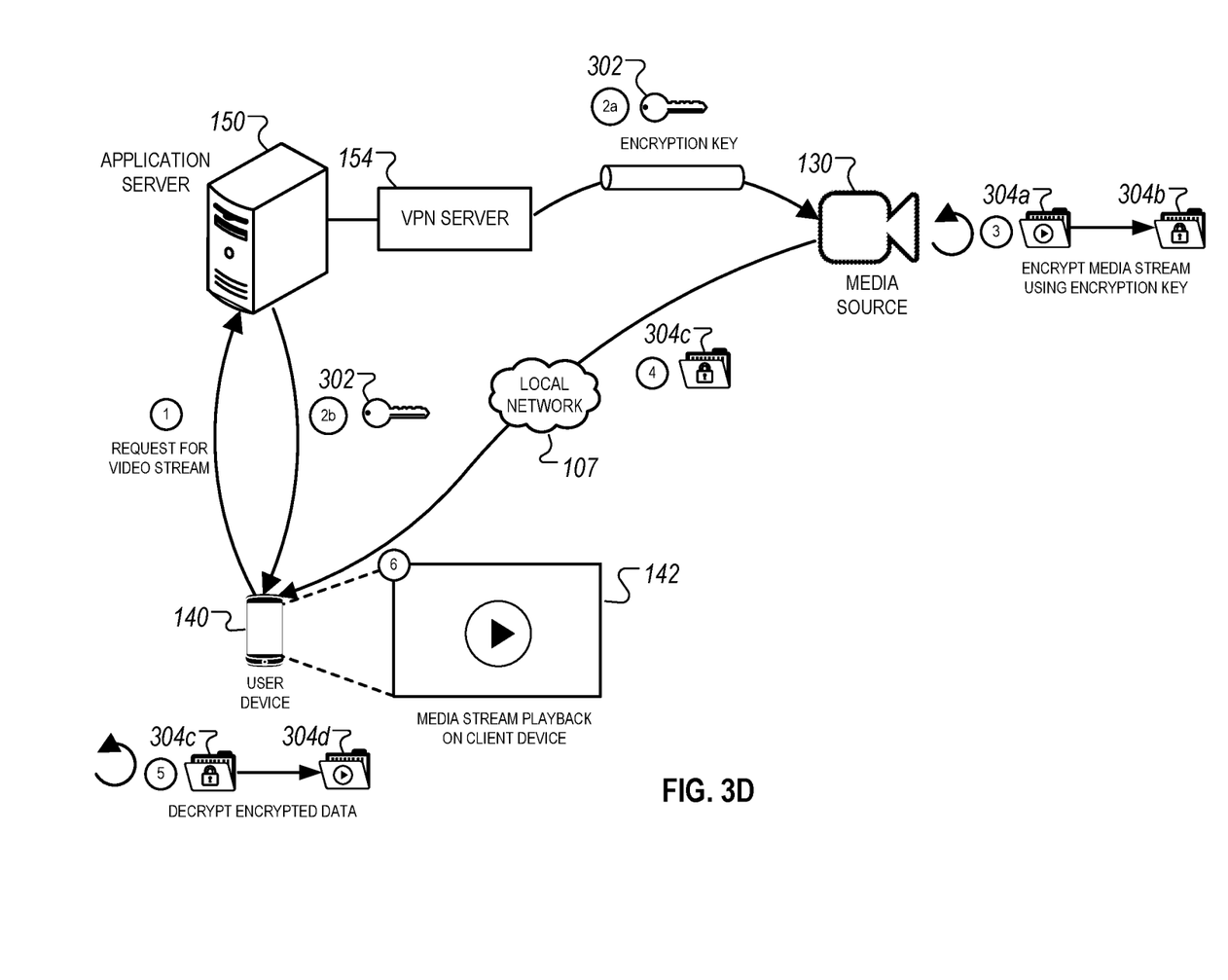

In other implementations, the instruction is transmitted both to the media source 130 and the user devices 140a, 140b. In such implementations, decryption of the encrypted media stream 134 can additionally or alternatively be performed on the user devices 140a, 140b. For example, FIG. 3C illustrates an example of an implementation where decryption takes place on the user device 140b when it is remote from the property 110. FIG. 3D illustrates an example of an implementation where decryption takes place on the user device 140a when it is located within the property 110.

The process 200 may include obtaining an encrypted data (230). For instance, the application server 150 obtains the encrypted media stream 134 from the media source 130 in a secure communication over the network 105. As described above, the media source 130 encrypts the captured media 132 using the encryption key 136 to generate the encrypted media stream 134. In some implementations, the media source 130 then transmits the encrypted media stream 134 in a secure UDP-based communication to reduce latency due to data transmission over the network 105. In some other implementations, the media source 130 may transmit the encrypted media stream 134 using any other suitable communication protocols to the application server 150 over the network 105.

The process 200 may include performing a particular action relating to the obtained encrypted data (240). For instance, the application server 150 may perform different actions based on the particular application associated with the encrypted media stream 134. In some implementations, the application server 150 simply decrypts the encrypted media stream 134 using the encryption key 136, processes the decrypted media stream, and then stores the processed media stream in the repository 152. An example of such an implementation is illustrated in FIG. 3A. Alternatively, in other implementations, the application server 150 decrypts the encrypted media stream 134 and then re-encrypts the decrypted media stream in a format that is readable and capable of being processed by the user devices 140a, 140b. An example of such implementations is illustrated in FIG. 3B.

In other implementations, the application server 150 proxies the encrypted media stream 134 and the encryption key 136 directly to the user devices 140a, 140b without actually decrypting the encrypted media stream 134. In such implementations, user devices 140a, 140b perform locally decrypt the encrypted media stream 134 and then provide the decrypted media stream for output on the user devices 140a, 140b. Examples of such implementations are illustrated below in FIG. 3C.

FIGS. 3A-3D illustrate examples of respective architectures 300A, 300B, 300C, and 300D for managing encryption keys for media streams. The illustrated architectures can be implemented within a system such as the system 100 illustrated in FIG. 1. The system 100 utilizes the each of the illustrated architectures to perform different functions relating to media streams captured by a media source (e.g., the media source 130). For example, the system 100 may utilize the architecture 300A to obtain a media stream directly from the media source 130 and store the obtained media stream. The system 100 may utilize the architecture 300B to re-encrypt obtained media stream in a manner that is suitable to the user devices 140a, 140b. The system 100 may utilize the architecture 300C to proxy the obtained media stream to the user devices 140a, 140b. The system 100 may utilize the architecture 300D to obtain the media stream directly from the media source 130 without the application server 150.

Referring initially to FIG. 3A, the system 100 utilizes the architecture 300A to perform a set of illustrated steps. At step (1), the application server 150 or a VPN server 154 initially generates an encryption key 302 as described above in FIGS. 1 and 2. The VPN server 154 then transmits the encryption key 302 to the media source 130 over a VPN tunnel as described above. In some implementations, the application server 150 itself and not the VPN server 154 may also transmit the encryption key 302 to the media source 130 using any suitable communication protocol.

At step (2), the media source 130 uses the received encryption key 302 to encrypt captured media 304a to generate an encrypted media stream 304b. The captured media 304a can represent any type of data stream collected by the media source 130. In some instances, the captured data 304a corresponds to the captured media 132 described above with respect to FIG. 1. The media source 130 may use various cryptographic techniques described above to encrypt the captured media 304a using the encryption key 302.

At step (3), the media source 130 transmits the encrypted media stream 304b to the application server 150 as encrypted media stream 304c. The communication between the application server 150 and the media source 130 can be a secure connection, or an unsecure connection, because the captured media stream 304a has already been encrypted by the media source 130. In addition, in some implementations, the encrypted media stream 304c is optionally transmitted to the application server 154 through the VPN tunnel of the VPN server 154. In other implementations, such as the example illustrated in FIG. 3A, the encrypted media stream 304c is instead transmitted on a separate communication channel, e.g., UDP, between the application server 150 and the media source 130.

At step (4), after the application server 150 has obtained the encrypted media stream 304c, the application server 150 decrypts the encrypted media stream 304c using the encryption key 302 to generate a decrypted media stream 304d. The decrypted media stream 304d is substantially similar to the media stream 304a captured by the media source 130.

At step (5), the application server 150 processes the decrypted media stream 304d to generate processed media stream 304e. The processing operation can include segmenting the decrypted media stream 304d based on detected events within the captured media stream 304a (e.g., segmenting a video stream based on detected motion in portions of the video stream). In other examples, the processing operation can include reducing the file size of the decrypted media stream 304d, applying a signal processing filter to the captured video stream, among others.

The application server 150 then stores the processed media stream 305e in the repository 152. Once stored, the processed media stream 305e can be accessed at a subsequent time point for viewing and editing. For example, the stored media stream can be accessed from the repository 152 in response to a request to view the media stream from the user devices 140a, 140b. In another example, the stored media stream may be accessed in response to a download request from the user devices 140a, 140b. In each of these examples, the stored media stream can be accessed on an ad-hoc basis.

Referring now to FIG. 3B, the system 100 utilizes the architecture 300B to perform the set of illustrated steps. Steps (1) through (4) are similar to their corresponding steps of FIG. 3A. In step (5), the application server 150 re-encrypts the decrypted media stream 304d in a format that is readable and/or capable of being processed by a user device 140. For example, as described above, because the communication between the application server 150 and the media source 130 is a UDP-based communication, the encrypted media stream 304b is optimized for UDP-based communications. The application server 150 instead re-encrypts the encrypted media stream 304*d* using HTTPS for real-time transmission on TLS-based communication between the application server 150 and the user device 140.

At step (6), the application server 150 transmits a re-encrypted media stream 304*f* to the user device 140. The user device 140 then decrypts the received media stream and provides the decrypted media file for output on the user device 140 as media playback 142. in this regard, the system 100 can utilize the architecture 300B to minimize latency in the playback 142 relative to playback on the media source 130. As described above, if the playback 142 is a real-time stream of video captured by the media source 130, then the architecture 300B enables the system 100 to use key management techniques to establish a secure communication using UDP with minimal latency.

Referring now to FIG. 3C, the system 100 utilizes the architecture 300C to perform a set of illustrated steps to securely transmit a media stream captured by the media source 130 for playback on the user device 140. At step (1), the application server 150 initially receives a request for a media stream from the user device 140. The request may be transmitted in response to receiving a user input on the user device 140 requesting a media stream. The user may provide the user input through a webpage accessed through the user device 140, or on a native application that runs on the user device 140. As an example, the user may request to view a live video feed of the media source 130 on the user device 140. The client device then transmits the request to the application server 150.

At step (2*a*), the VPN server 154 of the application server 150 generates and transmits the encryption key 302 to the media source 130 in a similar manner as step (1) of FIG. 3A. At step (2*b*), the application server 150 sends the encryption key 302 to the client device 140 using a secure communication protocol such as HTTPS. Steps (3) and (4) are similar to steps (2) and (3) of FIG. 3A. In the example illustrated in FIG. 3C, the captured media stream 304*a* is a live stream of the media source 130.

At step (5), the application server 150 transmits the encrypted media stream 304*c* to the user device 140. In this example, the application server 150 proxies the encrypted media stream 304*c* to the user device 140 directly without decrypting it. Instead, the decryption of the encrypted media stream 304*c* is performed at the user device 140 as indicated in step (6).

At step (6), the user device 140 decrypts the encrypted media stream 304*c* using the encryption key 302 to generate the decrypted media stream 304*d* in a manner similar to step (4) of FIG. 3A. At step (7), the user device 140 provides the decrypted media stream 304*d* for output responsive to the received input as the media playback 142 in a manner similar to step (6) of FIG. 3B.

Referring now to FIG. 3D, the system 100 utilizes the architecture 300D to perform a set of illustrated steps to securely transmit a local media stream captured by the media source 130 for playback on the user device 140. In this example, the media device 130 and the user device 140 are connected over a local network 107 that is located within a property (e.g., the property 101). For example, the user device 140 is the user device 140*a* that is located within the property 101.

Steps (1), (2*a*), (2*b*), and (3) are similar to corresponding steps of FIG. 3C. The media source 130 and the client device 140 encrypts and decrypts the captured media stream 304*a* in a similar manner to techniques depicted in FIG. 3B. In this example, at step (4), the media source 130 transmits the encrypted media stream 304*c* directly to the user device 140 without exchanging communications with the application server 150. At step (5), the user device 140 decrypts the encrypted media stream 304*c* in a similar manner to step (6) of FIG. 3C. At step (6), the user device 140 provides the decrypted media stream 304*d* for output responsive to the received input as the media playback 142 in a manner similar to step (7) of FIG. 3C.

In the example illustrated, the media source 130 is able to transmit the encrypted media stream 304*d* directly to the user device 140 because the user device 140 and the media source 130 are connected over a local network 107 (e.g., a WLAN connection, or some other type of proximity-based connection). In this example, the system 100 utilizes direct transmission of the encrypted media stream 304*c* to further reduce latency associated with the playback 142 on the user device 140.

Figure 4:
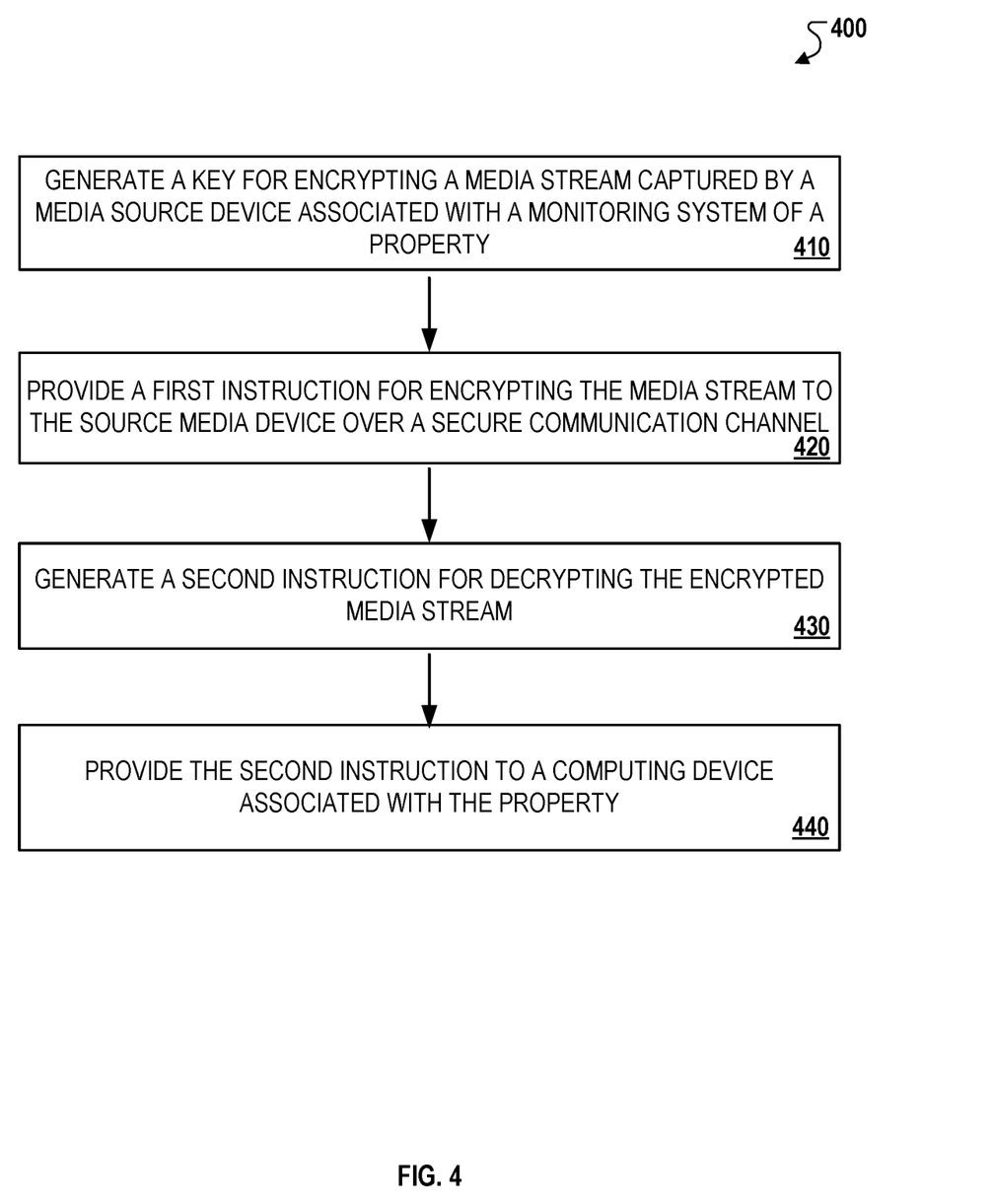
FIG. 4 illustrates an example of a process for stream encryption key management.

FIG. 4 illustrates an example of a process 400 for stream encryption key management. Briefly, the process 400 can include the operations of generating a key for encrypting a media stream captured by a media source device associated with a monitoring system of a property (410), providing a first instruction for encrypting the media stream to the source media device over a secure communication channel (420), generating a second instruction for decrypting the encrypted media stream (430), and providing the second instruction to a computing device associated with the property (440).

In general, the operations of the process 400 can be performed by one or more components of the system 100 to provide encryption key management for real-time applications using, for instance, UDP-based communications. In this regard, the process 400 can be used by the system 100 to perform key management techniques on an existing "out-of-band" secure communication channel without requiring complex management protocols. For instance, the key management techniques discussed below allow the system 100 to transmit an encrypted media stream in real-time (or substantially in real-time) over an unsecure network with minimal security risks. Specifically, transmission of an encrypted media stream reduces the security vulnerabilities associated with transmitting sensitive data (e.g., security footage of a property collected by a security camera) over an unsecure network. Additionally, because the encrypted media stream can be transmitted as UDP data packets, latency associated with streaming can be reduced relative to data transmission over, for example, TCP-based connections.

In more detail, the process 400 can include the operation of generating a key for encrypting a media stream captured by a media source device associated with a monitoring system of a property (410). For example, the application server 150 can generate the encryption key 302 for encrypting media 304*a* captured by the media source 130. As discussed above, the media 304*a* can represent a data file, e.g., a video file of video collected by the media source 130, or alternatively, a media stream of a live video being captured by the media source 130. The encryption key 302 can be associated with various cryptographic techniques that are used to encrypted the media 304*a*.

The process 400 can include the operation of providing a first instruction for encrypting the media stream to the source media device over a secure communication channel (420). For example, the application server 150 can transmit an instruction to the media source 130 over a secure communication channel. As discussed above in reference to FIGS. 3A-D, the secure communication channel can be a persistent VPN tunnel associated with the VPN server 154, a persistent web socket tunnel, or some other type of existing encrypted channel. As discussed above, the first instruction causes the media source 130 to encrypt the media 304a using the encryption key 302 when the first instruction is received by the media source 130. The media source 130 can apply one or more cryptographic techniques specified by the encryption key 302 to encrypt the media 304a and generate the encrypted media stream 304b.

The process 400 can include the operation of generating a second instruction for decrypting the encrypted media stream (430). For example, the application server 150 generates a second instruction that is used by one or more computing devices on which the media 304a is to be accessed (e.g., the user devices 140a-b). In some implementations, the second instruction can the encryption key 302 (or alternatively, a corresponding decryption key) that is used by the computing devices to decrypt the encrypted media stream 304b.

The process 400 can include the operation of providing the second instruction to a computing device associated with the property (440). For example, the application server 150 can provide the second instruction to a computing device that is associated with the property 101 (e.g., the user devices 140a-b). The second instruction causes the computing device to decrypt the encrypted media stream 304b when it is received by the computing device.

In some implementations, the second instruction is provided in response to a request to access the media 304a on the user device 140. For example, as depicted in FIG. 3C, the application server 150 can initially obtain a request to access the media 304a on the user device 140. In response to receiving the request, the application server 150 can obtain the encrypted media stream 304c. In some instances, the encrypted media stream 304c can be obtained on the same communication channel as the communication channel that is used to transmit the encryption key 302 (e.g., the VPN channel associated with the VPN server 154). Alternatively, in other instances, the encrypted media stream 304c is instead obtained on a separate and distinct communication channel between the application server 150 and the media source 130. In such instances, the VPN channel can be a TCP-based communication channel whereas the communication channel used to obtain the media 304a can be a UDP-based communication channel (which has lower data transmission latency). In this regard, the application server 150 can obtain, for instance, the encrypted media stream 304c securely in real-time (or substantially in real-time) without requiring a secure connection.

As discussed above in FIG. 3B, the application server 150 can proxy the encrypted media stream 304c directly to the computing device 140 without decrypting it to reduce network latency that may be attributable to decryption prior to transmission. In such implementations, the application server 150 can generate a decryption key for decrypting the encrypted media stream 304c. The decryption key can be generated based on the encryption key 302 as discussed above. In such implementations, the second instruction can include the decryption key and one or more commands that cause the user device 140 to decrypt and render the encrypted media stream 304c as media playback 142. In this regard, decryption is performed locally on the computing device 140 using the decryption key.

In some other implementations, instead of obtaining and sending the encrypted media stream 304c to the user device 140, the application server 150 can instead instruct the media source 130 to directly transmit the encrypted media stream 304c to the user device 140 over the local network 107 of the property 101. For example, as depicted in FIG. 3D, in response to receiving a request to access the media 304a from the user device 140, the application server 150 can transmit a third instruction to the media source 130 that, when received by the media source 130, causes it to transmit the encrypted media stream 304c to the user device 140 over the local network 107. In this example, the user device 140 is determined to be located in the property 101, and therefore, the encrypted media stream 304c is not needed to be transmitted to the application server 150 over a wide area network such as the Internet.

In some implementations, the application server 150 stores the encrypted media stream 304c in a database record associated with a monitoring system that includes the media source 130. For example, as depicted in FIG. 3A, the application server 150 can obtain the encrypted media stream 304c from the media source 130. The application server 150 can then decrypt the encrypted media stream 304c to generate the decrypted media stream 304d, and process the decrypted media stream 304d to generate the processed media stream 304e. The processed media stream 304e can be stored in the database record within the data repository 152 that is associated with the property 101. In such implementations, media captured by the media source 130 can be periodically and securely obtained by the application server 150 and stored in the database record for subsequent viewing and/or access.

In some implementations, the process 400 can include additional operations discussed below. For instance, the operation 400 can also include determining a particular encryption format for the encrypting the decrypted media stream for transmission to the user device 140. For example, as depicted in FIG. 3B, the application server 150 can determine the particular encryption format based on a device type of the user device 140. The particular encryption format can represent a format that is capable of being decrypted by the user device 140 based on, for instance, the processing capabilities of the user device 140, the storage capacity of the user device 140, the available memory on the user device 140 that can be used for decryption, among others. In such implementations, the application server 150 re-encrypts the decrypted media stream 304d according to the particular encryption format to generate the encrypted media stream 304f. As discussed above, decryption of the encrypted media stream 304f by the user device 140 can be used to reduce the latency between the playback 142 and the playback of the media stream 304a on the media source 130 due to decryption. Additionally, in such implementations, the second instruction includes the encrypted media stream 304f and one or more commands that permit the user device 140 to decrypt and render the encrypted media stream 304f as the playback 142.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
   providing, to a media source device and over a secure Transport Control Protocol (TCP) communication channel, an encryption key that permits encryption of a live video stream of a property that is captured in real time by the media source device, wherein the media source device is associated with a monitoring system of the property;
   obtaining, from a computing device, a request to access the live video stream, wherein the computing device is remote from the property when providing the request;
   providing an instruction to the media source device that, when received by the media source device, causes the media source device to encrypt the live video stream being captured using the encryption key;
   obtaining, from the media source device and over an unsecure User Datagram Protocol (UDP) communication channel, an encrypted live video stream that was encrypted by the media source device using the encryption key; and
   providing, to the computing device in response to the request and over the unsecure UDP communication channel, data indicating the encrypted live video stream and a set of instructions that, when received by the computing device, causes the computing device to (i) decrypt the encrypted live video stream and (ii) based on decrypting the live video stream, access the live video stream while the live video stream is being captured by the media source device.

2. The method of claim 1, further comprising:
   generating a decryption key for decrypting the encrypted live video stream; and
   wherein the set of instructions provided to the computing device includes (i) the decryption key, and (ii) one or more commands that cause the computing device to decrypt and render the encrypted live video stream using the decryption key.

3. The method of claim 1, wherein the secure TCP communication channel comprises a virtual private network (VPN) channel.

4. The method of claim 1, further comprising:
   decrypting the encrypted live video stream using a decryption key; and
   storing a decrypted live video stream in a database record associated with the monitoring system of the property.

5. The method of claim 4, further comprising:
   determining, based on a device type of the computing device, a particular encryption format for encrypting the decrypted live video stream for transmission to the computing device;
   encrypting the decrypted live video stream according to the particular encryption format;
   generating a second encrypted live video stream based on encrypting the decrypted live video stream according to the particular encryption format; and
   wherein the data provided to the computing device includes (i) the second encrypted live video stream and (ii) one or more commands that permit the computing device to decrypt and render the second encrypted live video stream.

6. The method of claim 1, wherein the encrypted live video stream and the set of instructions are provided to the computing device over a same communication channel.

7. The method of claim 1, wherein:
   the media source device comprises a security camera located in the property; and
   the live video stream comprises security footage of the property captured in real time by the security camera.

8. The method of claim 1, wherein:
   the instruction that is provided to the media source device causes the media source device to encrypt a first portion of the live video stream being captured using the encryption key;
   the encrypted live video stream obtained from the media source device comprises a first encrypted portion of the live video stream that was encrypted by the media source device using the encryption key; and
   the set of instructions provided to the computing device causes the computing device to (i) decrypt the first encrypted portion of the live video steam and (ii) based on decrypting the first encrypted portion of the live video stream, access the first portion of the live video stream while a second portion of the live video stream is being captured by the media source device.

9. The method of claim 1, wherein providing the data indicating the encrypted live video stream and the set of instructions to the computing device comprises, providing, to the computing device, one or more UDP data packets over the unsecure UDP communication channel.

10. A system comprising:
    one or more computers; and
    one or more storage devices storing instructions that, when executed by the one or more computers, cause the one or more computers to perform operations comprising:
      providing, to a media source device and over a secure Transport Control Protocol (TCP) communication channel, an encryption key that permits encryption of a live video stream of a property that is captured in real time by the media source device, wherein the media source device is associated with a monitoring system of the property;

obtaining, from a computing device, a request to access the live video stream, wherein the computing device is remote from the property when providing the request;

providing an instruction to the media source device that, when received by the media source device, causes the media source device to encrypt the live video stream being captured using the encryption key;

obtaining, from the media source device and over an unsecure User Datagram Protocol (UDP) communication channel, an encrypted live video stream that was encrypted by the media source device using the encryption key; and providing, to the computing device in response to the request and over the unsecure UDP communication channel, data indicating the encrypted live video stream and a set of instructions that, when received by the computing device, causes the computing device to (i) decrypt the encrypted live video stream and (ii) based on decrypting the live video stream, access the live video stream while the live video stream is being captured by the media source device.

11. The system of claim 10, wherein the operations further comprise:

generating a decryption key for decrypting the encrypted live video stream; and wherein the set of instructions provided to the computing device includes (i) the decryption key, and (ii) one or more commands that cause the computing device to decrypt and render the encrypted live video stream using the decryption key.

12. The system of claim 10, wherein the operations further comprise:

decrypting the encrypted live video stream using a decryption key; and storing a decrypted live video stream in a database record associated with the monitoring system of the property.

13. The system of claim 12, wherein the operations further comprise:

determining, based on a device type of the computing device, a particular encryption format for encrypting the decrypted live video stream for transmission to the computing device;

encrypting the decrypted live video stream according to the particular encryption format;

generating a second encrypted live video stream based on encrypting the decrypted live video stream according to the particular encryption format; and wherein the data provided to the computing device includes (i) the second encrypted live video stream and (ii) one or more commands that permit the computing device to decrypt and render the second encrypted live video stream.

14. A non-transitory computer-readable storage device encoded with computer program instructions that, when executed by one or more computers, cause the one or more computers to perform operations comprising:

providing, to a media source device and over a secure Transport Control Protocol (TCP) communication channel, an encryption key that permits encryption of a live video stream of a property that is captured in real time by the media source device, wherein the media source device is associated with a monitoring system of the property;

obtaining, from a computing device, a request to access the live video stream, wherein the computing device is remote from the property when providing the request;

providing an instruction to the media source device that, when received by the media source device, causes the media source device to encrypt the live video stream being captured using the encryption key;

obtaining, from the media source device and over an unsecure User Datagram Protocol (UDP) communication channel, an encrypted live video stream that was encrypted by the media source device using the encryption key; and providing, to the computing device in response to the request and over the unsecure UDP communication channel, data indicating the encrypted live video stream and a set of instructions that, when received by the computing device, causes the computing device to (i) decrypt the encrypted live video stream and (ii) based on decrypting the live video stream, access the live video stream while the live video stream is being captured by the media source device.

15. The device of claim 14, wherein the operations further comprise:

generating a decryption key for decrypting the encrypted live video stream; and wherein the set of instructions provided to the computing device includes (i) the decryption key, and (ii) one or more commands that cause the computing device to decrypt and render the encrypted live video stream using the decryption key.

16. The device of claim 14, wherein the operations further comprise:

decrypting the encrypted live video stream using a decryption key; and storing a decrypted live video stream in a database record associated with the monitoring system of the property.

* * * * *